United States Patent
Tani et al.

(10) Patent No.: US 7,633,843 B2
(45) Date of Patent: Dec. 15, 2009

(54) OPTICAL DISC RECORDER

(75) Inventors: Hironori Tani, Daito (JP); Ryusuke Noda, Daito (JP)

(73) Assignee: Funai Electric Co., Ltd, Daito-shi (JP)

( * ) Notice: Subject to any disclaimer, the term of this patent is extended or adjusted under 35 U.S.C. 154(b) by 548 days.

(21) Appl. No.: 11/519,126

(22) Filed: Sep. 12, 2006

(65) Prior Publication Data

US 2007/0058498 A1   Mar. 15, 2007

(30) Foreign Application Priority Data

Sep. 13, 2005   (JP)   ............................. 2005-265338

(51) Int. Cl.
  *G11B 20/10*   (2006.01)
(52) U.S. Cl. .................. 369/47.1; 369/30.19
(58) Field of Classification Search .............. 369/30.05, 369/30.07, 30.19, 47.1, 47.13, 59.25
  See application file for complete search history.

(56) References Cited

U.S. PATENT DOCUMENTS

| 6,724,705 | B1 | 4/2004 | Ko et al. |
| 7,330,410 | B2* | 2/2008 | Ohhashi .................. 369/53.18 |

FOREIGN PATENT DOCUMENTS

| JP | 11-176143 A | 7/1999 |
| JP | 2002-197789 A | 7/2002 |
| JP | 2002-244753 A | 8/2002 |
| JP | 2003-59051 A | 2/2003 |
| JP | 2003-272292 A | 9/2003 |
| JP | 2004-127437 A | 4/2004 |
| JP | 2004-213748 A | 7/2004 |
| JP | 2005-080226 A | 3/2005 |

OTHER PUBLICATIONS

Japanese Office Action including English translation dated Mar. 4, 2008 (three (3) pages).

* cited by examiner

*Primary Examiner*—Thang V Tran
*Assistant Examiner*—Brenda Bernardi
(74) *Attorney, Agent, or Firm*—Crowell & Moring LLP

(57) ABSTRACT

Before erasure of data, an optical head (6) reads file management data which manages user data from a file management data area "A" of an optical disk (2). A control unit (3) writes the information to a hard disc drive apparatus (10) and/or RAM (9) to save the file management data. After saving of the file management data, the optical head (6) writes the data for erasing the file management data into the file management data area "A". According to a signal from the data erasure cancel instruction key or button (42, 52), after erasure of the data, the control unit (3) reads the saved file management data from the hard disc drive apparatus (10) and/or RAM (9). The optical head (6) writes the file management data into the file management data area "A" of the optical disc (2) so as to be returned. Thus, even after data erasure processing, the user use the user data again before erasure by using the file management data.

1 Claim, 6 Drawing Sheets

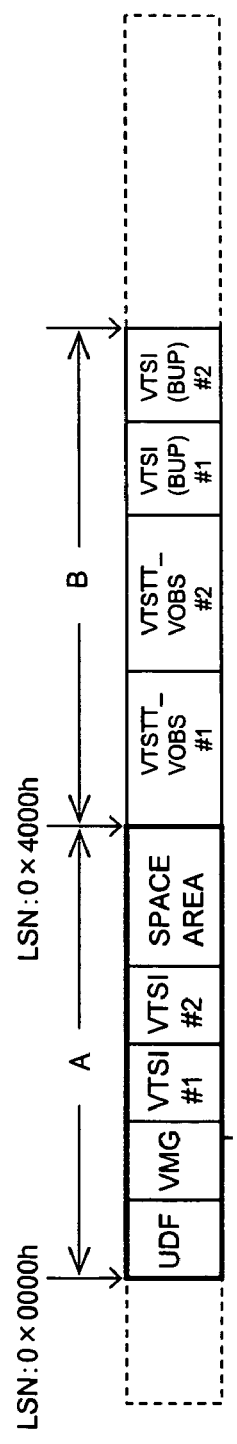
FIG.2A  BEFORE SAVING FILE MANAGEMENT DATA
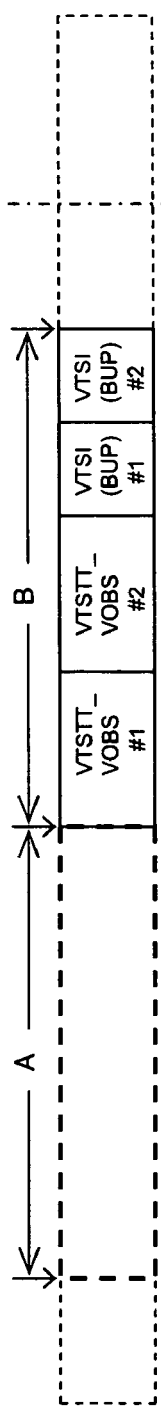
FIG.2B  AFTER SAVING FILE MANAGEMENT DATA (AFTER ERASING DATA)
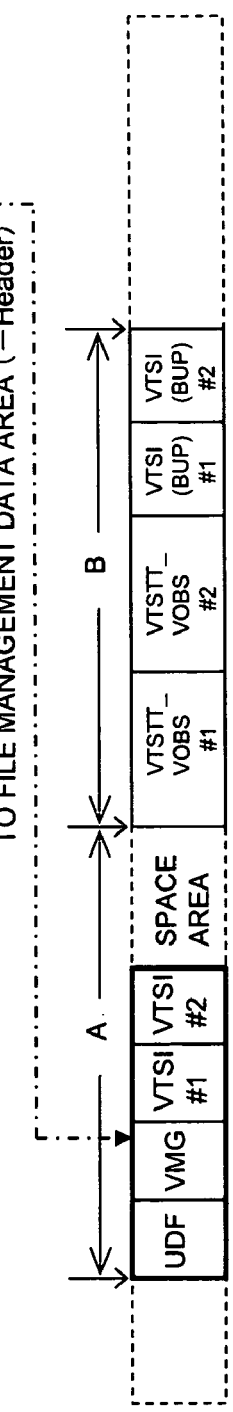
FIG.2C  AFTER RETURNING SAVED DATA

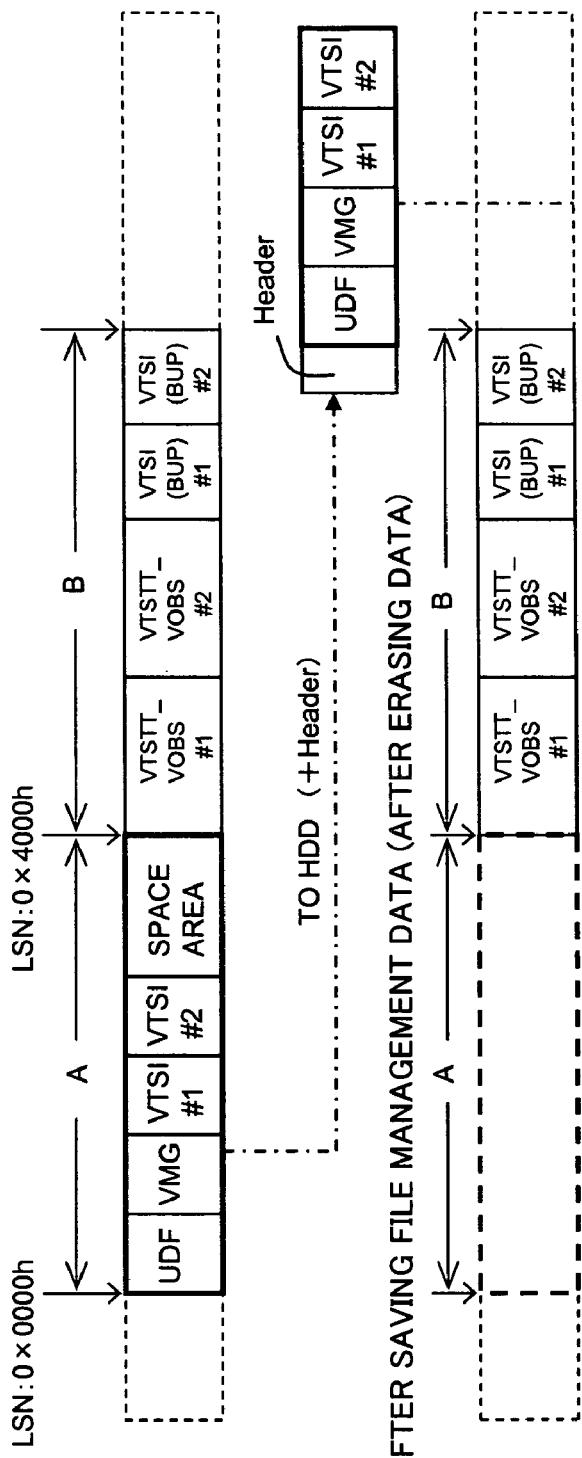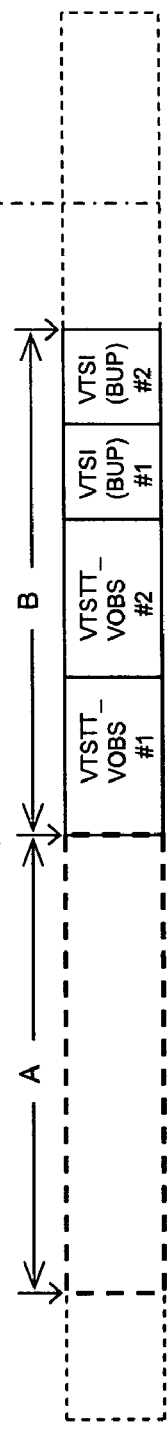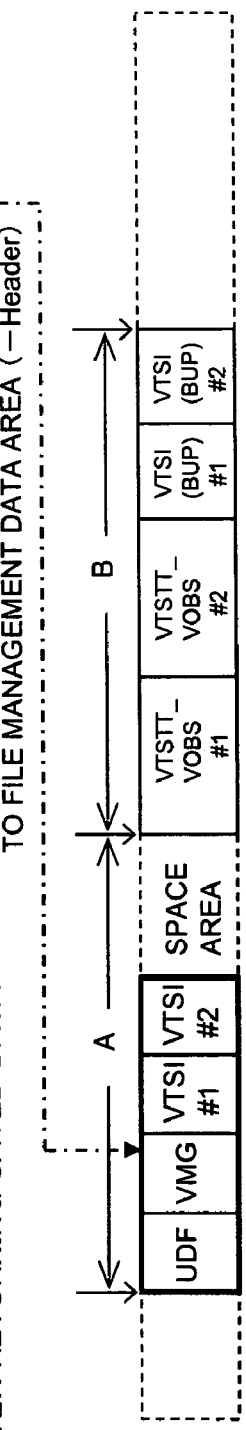
FIG.5A BEFORE SAVING FILE MANAGEMENT DATA
FIG.5B AFTER SAVING FILE MANAGEMENT DATA
FIG.5C AFTER RETURNING SAVED DATA

OPTICAL DISC RECORDER

BACKGROUND OF THE INVENTION

1. Field of the Invention

The present invention relates to an optical disk recorder having a function of erasing data in an optical disk.

2. Description of the Related Art

Conventionally, an optical disc recorder has a function for formatting an optical disc further to functions for writing data into the optical disc and reproducing the data written in the optical disc. The optical disc to which data are recordable includes write-once optical discs into which the data can be written only once and rewritable optical discs into which data can be rewritten repeatedly by a predetermined times. As for the write-once optical disc, CD-R (CD Recordable), DVD-R (DVD Recordable), DVD+R (DVD Recordable) are exemplified. Furthermore, as for the rewritable optical disc, CD-RW (CD Rewritable), DVD-RW (DVD Rewritable), DVD+RW (DVD Rewritable), DVD-RAM (DVD Random Access Memory) are exemplified.

In the rewritable optical disk, new data can be overwritten over data written on the disc and the data already written on the disc can be erased. When a user erases the data written on the optical disk, a picture which renders the user to confirm execution of erasure is displayed on a monitor screen connected to the optical disk recorder to which the optical disk inserted or a personal computer which mounts the optical disc recorder. When the user selects erasure, the data written on the optical disk is erased, so that the user cannot use the erased data again. Thus, when the user erases data by mistake or persons other than the user erase data intentionally or inadvertently, the user cannot use the erased data again.

Therefore, Japanese Laid-Open Patent Publication No. 2002-197789 discloses a recording medium which stores record protection data for protecting data written on the recording medium against undesired writing or erasure in order to prevent non-availability of the data due to accidental data erasure. However, although this recording medium can prevent undesired data erasure, the user cannot use the erased data in the same way as before erasure.

Japanese Laid-Open Patent Publication No. 2003-272292 discloses a recording medium in which write control data representing whether the optical disk is in a data write inhibit state or data write enable state is written to control writing/erasure of data to/from the optical disk and based on the information, writing of data to the optical disk is controlled. However, although the recording medium can control erasure of data in the optical disk on the basis of the control data, when the user erases the data due to a wrong operation of the recording medium, the erased data cannot be used again.

Japanese Laid-Open Patent Publication No. 2004-213748 discloses an optical disk apparatus in which data is written at a location shifted from a location where data should be stored and accessed on the basis of an identification ID unique to the optical disk device to prevent that persons other than the user erase data with malicious intent and the user cannot use the data. However, in an optical disk on which data is written by the optical disk device, data is stored at the location shifted from the proper location. Thus, OS (Operating System) in other apparatuses other than this optical disc apparatus cannot recognize the data. Accordingly, although the third person cannot erase the data by using the other devices with malicious intent, when the user erases the data in the optical disk by mistake, the erased data cannot be used again.

Japanese Laid-Open Patent Publication No. 2003-059051 discloses an optical disk apparatus in which data to be written is sent again to a host system when the power cuts off during processing of writing data to an optical disk and the data writing processing is interrupted, resulting in loss of various kinds of data necessary for the data writing processing, and at restart of data writing, pseudo data writing processing is executed up to the data writing interrupt location to reconstitute the lost data. In this optical disk, when the data writing processing is interrupted, various kinds of data lost due to interruption is reconstituted. However, when the third person erases the user data in the optical disk with malicious intent, the erased data cannot be used again.

Japanese Laid-Open Patent Publication No. 2002-244753 discloses an optical disk in which installation management data is formed as a ROM or written in a recording area. A method for installing an application program forcibly executing an erasure operation with respect to a ROM area which records an install program therein in the optical disk to erase illegal copied data is also known. However, according to the installation method, although illegal data installation is prevented and data in the illegal copied optical disk is erased, when the user erases data stored in the optical disk, the data cannot be used again after the erasure processing.

SUMMARY OF THE INVENTION

In order to solve the above-mentioned problems, the present invention intends to provide an optical disk recorder in which after data in an optical disk is erased, the user can use the data before erasure again.

An optical disk recorder in accordance with an aspect of the present invention comprises: a data writing means for writing data into an optical disk; a data reading means for reading data from an optical disk; a data erasure instruction means, which is operated by a user, to instruct to perform erasure of data of an optical disc to the data writing means; a data erasure instruction cancel means, which is operated by the user, to instruct to cancel the data erasure instruction to the data writing means; a main control means for controlling entire of the optical disc recorder; and a connection means for connecting the main control means with an external storage device and/or a RAM (Random Access Memory).

When the data erasure instruction means instruct to perform erasure of data of an optical disc, the data reading means reads out file management data from a file management data area of the optical disc before erasing the file management data, the data writing means writes the file management data into the external storage device and/or RAM so as to save the file management data, and subsequently, the data writing means writes predetermined data for erasing the file management data into the file management data area.

When the data erasure instruction cancel means instructs to cancel the erasure of the data, the main control means reads out the file management data saved in the external storage device and/or the RAM through the connection means, and the data writing means writes the file management data read out from the external storage device and/or the RAM into the file management data area where the file management data were originally written.

With such configuration, prior to erasure of the data, the data reading means reads data including the file management data from the file management data area. The control means writes the data into the external storage device and/or the RAM through the connection means to save the data. Following to saving of the data, the data writing means erases the data in the file management data area. According to the signal from the data erasure cancel instruction means, after erasure of the data, the control means reads the saved data from the external storage device and/or the RAM through the connection means. The data writing means writes the data in the file management data area to be returned thereto. Thus, by operating the optical disk recorder after erasure of the data to cancel the data erasure instruction, the user can use the data before erasure again. By using the external storage device and/or the RAM, not optical disk, to save the file management data, access time to the data can be shortened.

BRIEF DESCRIPTION OF THE DRAWINGS

FIGS. 2A to 2C are diagrams each showing a data structure in an optical disk (DVD+RW) used in the above optical disk recorder in the first embodiment;

FIGS. 5A to 5C are diagrams each showing a data structure in an optical disk (DVD+RW) used in the above optical disk recorder in the second embodiment.

DETAILED DESCRIPTION OF THE EMBODIMENTS

First Embodiment

An optical disk recorder in accordance with a first embodiment of the present invention will be described with reference to FIG. 1 to FIG. 3. An optical disk in accordance with the first embodiment of the present invention is, for example, a DVD+RW and the optical disk recorder is, for example, a DVD recorder for recording and/or reproducing video, music and sound.

Figure 1:
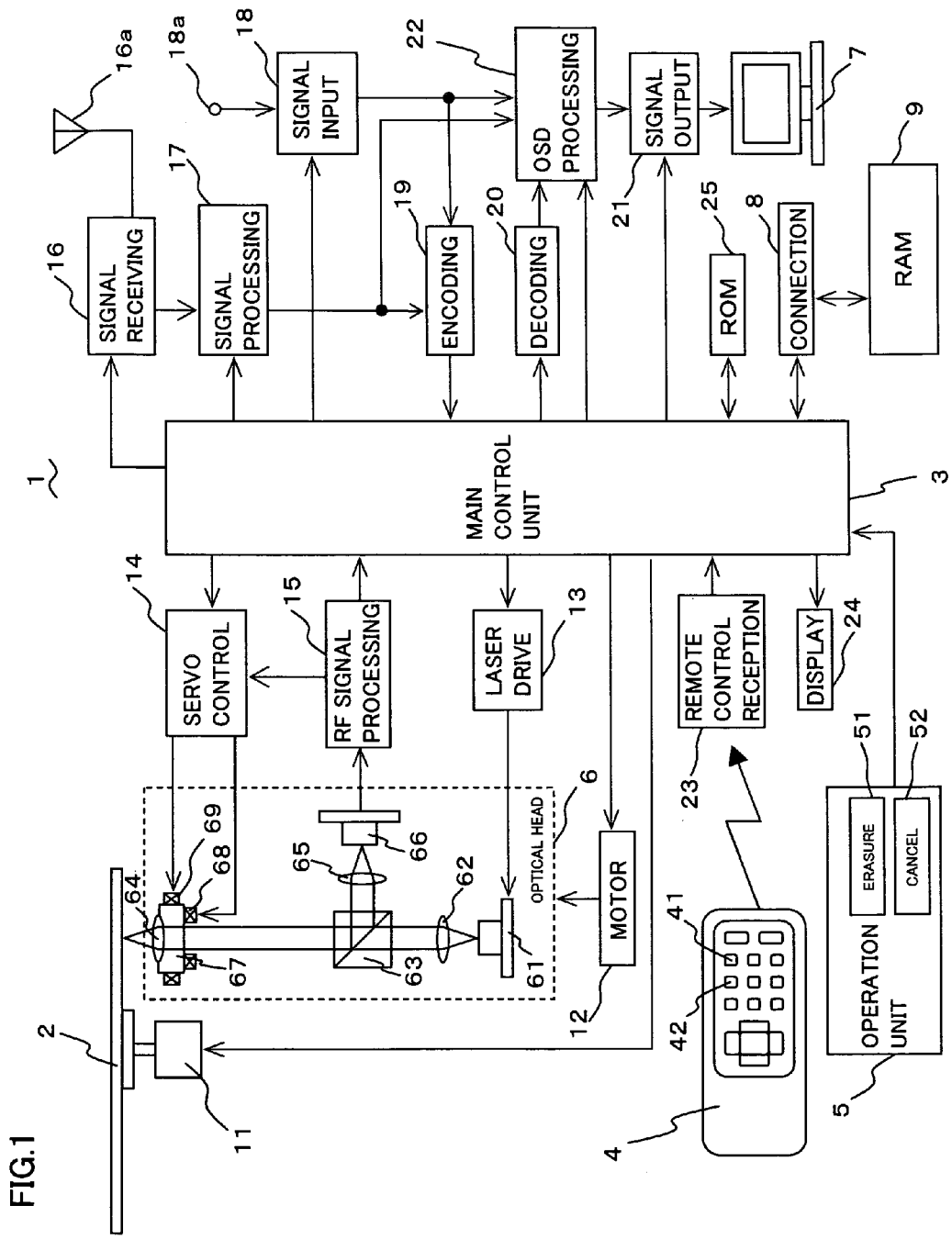
FIG. 1 is a block diagram showing a configuration of an optical disk recorder in accordance with a first embodiment of the present invention.

FIG. 1 shows a configuration of an optical disk recorder 1. The optical disk recorder 1 serves to record data into an optical disk 2 and to read date from the optical disk 2. The optical disc recorder 1 has a main control unit 3 (control means) comprised of a CPU and so on for controlling entire of the optical disk recorder 1, a remote controller 4 and an operation unit 5 which is operated by a user to issue instructions to the main control unit 3 and an optical head 6 for writing and/or reading data. The optical disk recorder 1 is connected to a monitor display apparatus 7 for displaying a menu picture to render the user for selecting operations and connected to a RAM 9 for transferring data through a connection unit 8.

The optical disk 2 is inserted into a disk insertion unit (not shown) and attached to a spindle motor 11. The spindle motor 11 is rotationally driven by the main control unit 3 and rotates the optical disk 2 attached thereto. A driving motor 12 is formed of a linear motor and moves the optical head 6 in a radial direction of the optical disk 2 with facing a recording face of the optical disc 2.

The optical head 6 writes data into the optical disk 2 by forming a pit on the recording face of the optical disk 2 and reads data written in the optical disk 2 by detecting the pit formed on the recording face of the optical disk 2. The optical head 6 comprises a semiconductor laser 61, a collimator lens 62, a beam splitter 63, an objective lens 64, a condenser lens 65 and a light receiving element 66.

The semiconductor laser 61 is driven by a laser driving unit 13 to emit a light beam. The light beam emitted from the semiconductor laser 61 is focused and irradiated on the optical disk 2 through the collimator lens 62, the beam splitter 63 and the objective lens 64. The light reflected on the optical disk 2 is focused on the light receiving element 66 through the objective lens 64, the beam splitter 63 and the condenser lens 65. The objective lens 64 is held on a lens holder 67 and moved due to magnetic action of a focusing coil 68 and a tracking coil 69 which are driven and controlled by a servo control unit 14 in a direction vertical to the recording face of the optical disk 2 and in the radial direction of the optical disk 2. With the movement of the objective lens 64, position of a focused point and beam spot diameter of the light which is emitted from the semiconductor laser 61 and focused on the optical disk 2 are adjusted. A light receiving face of the light receiving element 66 is divided into a plurality of areas and each areas of the light receiving surface outputs an electrical signal according to received light intensity.

The optical head 6 with such configuration radiates the light beam emitted from the semiconductor laser 61 to the optical disk 2, thereby altering a recording layer of the optical disk 2 to form a pit on the optical disk 2. Reflectance of the light is changed at the altered portion of the recording layer. The optical head 6 radiates the light beam emitted by the semiconductor laser 61 to the optical disk 2 and the light receiving element 66 receives the light reflected on the optical disk 2, thereby detecting the pit formed on the recording layer of the optical disk 2. For detecting the existence of the pits on the recording layer of the optical disc, intensity of the light beam emitted from the semiconductor laser 61 is decreased so as not to alter the recording layer of the optical disk 2.

The laser driving unit 13 controls timing for emitting the light beam and intensity of the light beam emitted from the semiconductor laser 61 based on the signal from the main control unit 3. An RF signal processing unit 15 generates and outputs an RF signal (reflection intensity signal), a focusing error signal and a tracking error signal based on output signals from the light receiving element 66. The servo control unit 14 drives the focusing coil 68 and the tracking coil 69 based on the focusing error signal and the tracking error signal from the RF signal processing unit 15, thereby moving the objective lens 64 to control position of the focused point of the light beam irradiated from the semiconductor laser 61 onto the optical disk 2.

A broadcast signal reception unit 16 receives a TV broadcast signal via an antenna 16a based on a signal from the main control unit 3 so that receiving frequency of it is tuned to frequency of the TV broadcast signal delivered from a broadcast station. A received signal processing unit 17 demodulates the TV broadcast signal received by the broadcast signal reception unit 16 to generate audio signals and visual signals corresponding to a signal from the main control unit 3. A signal input unit 18 is operated corresponding to a signal from the main control unit 3. Various signals representing data such as video, music and documents are inputted to the signal input unit 18 from external equipment (not shown) such as a video camera, a digital camera and a personal computer.

An encoding unit 19 encodes the audio signals and the visual signals generated by the received signal processing unit 17 and the signals inputted from the signal input unit 18 into a predetermined format based on a signal from main control unit 3 so as to record these signals on the optical disk 2 as encoded data. A decoding unit 20 decodes the encoded data read from the optical disk 2 corresponding to a signal from the main control unit 3.

A signal output unit 21 outputs the audio signals and visual signals generated by the received signal processing unit 17, the signals inputted from the signal input unit 18 and the signals decoded by the decoding unit 20 to external equipment such as the monitor 7, a speaker and a personal computer (not shown) based on a signal from main control unit 3. An OSD (On Screen Display) processing unit 22 superimposes an on-screen image signal for displaying an on-screen image on the monitor 7 on the video signals decoded by the received signal processing unit 17, the signals inputted from the signal input unit 18 and the signals decoded by the decoding unit 20 corresponding to a signal from the main control unit 3.

The remote controller 4 is operated by the user to instruct various operations of the optical disk recorder 1 including selection of a receiving channel of the TV broadcast signal, writing of data such as video, music and documents on the optical disk 2 and reproduction of the data stored on the optical disk 2. The remote controller 4 has various operation keypads operated by the user to instruct various operations of the optical disk recorder 1 and by operating each of the various operation keys, outputs an infrared code signal associated with the respective operation. The various operation keypads include a data erasure key 41 serving as a data erasure instruction means and a data erasure cancel key 42 serving as a data erasure cancel instruction means. When the user presses the data erasure key 41, the remote controller 4 instructs the main control unit 3 to erase the data written on the optical disk 2. When the user presses the data erasure cancel key 42, the remote controller 4 instructs the main control unit 3 to cancel the data erasure instruction.

A remote controller reception unit 23 receives the infrared signal transmitted from the remote controller 4, converts the signal into an electrical signal and outputs the electric signal corresponding to the operation of the remote controller 4 to the main control unit 3. A display unit 24 is provided in the main unit of the optical disk recorder 1 and displays the operation performed by the remote controller 4 and an operating state of the optical disk recorder 1 thereon. A ROM (Read Only Memory) 25 stores an operation program of the main control unit 3 therein.

The operation unit 5 has various operation buttons operated by the user to instruct various operations of the optical disk recorder 1 including writing of data such as video signals on the optical disk 2 and reproduction of the data written on the optical disk 2 and by operating each of the various operation buttons, outputs a signal associated with the respective operation to the main control unit 3. The operation unit 5 includes a data erasure button 51 serving as a data erasure instruction means and a data erasure cancel button 52 serving as a data erasure cancel instruction means. When the user presses the data erasure button 51, an instruction to erase the data written on the optical disk 2 is issued to the main control unit 3. When the user presses the data erasure cancel button 52, an instruction to cancel the data erasure instruction is issued to the main control unit 3.

The monitor display apparatus 7 displays various menu pictures on a screen thereof based on a signal from the main control unit 3. The monitor display apparatus 7 has an item for instructing data erasure in a menu. When the user operates the remote controller 4 or the operation unit 5 and selects the item for instructing data erasure in the menu, the instruction to erase the data written on the optical disk 2 is issued to the main control unit 3. The monitor display apparatus 7 further has an item for canceling the data erasure instruction. When the user operates the remote controller 4 or the operation unit 5 and selects the item for canceling the data erasure instruction, the instruction to cancel the data erasure instruction is issued to the main control unit 3. Through the above-mentioned operations, the monitor display apparatus 7, the main control unit 3, the remote controller 4 and the operation unit 5 constitute the data erasure instruction means and the data erasure cancel instruction means.

The RAM (Random Access Memory) 9 is connected to the connection unit 8 serving as a connection means. The connection unit 8 is constituted by, for example, a bus as a transmission path for transmitting data. The RAM 9 is a storage device using a semiconductor device and stores data read by the main control unit 3 from the optical disk 2 therein. Since writing and reading of data is electrically performed, access speed is fast. As for the RAM 9, a DARM (Dynamic Random Access Memory) or a SRAM (Static Random Access Memory) can be used. Data transmission between the RAM 9 and the main control unit 3 is performed through the connection unit 8. The RAM 9 is provided in a housing of the optical disk recorder 1.

Data writing into the optical disk 2 is performed by encoding the audio signals and the visual signals generated by the received signal processing unit 17 or the signals inputted from the signal input unit 18 by the encoding unit 19 and forming pits on the optical disk 2 having predetermined lengths and arrangement corresponding to the encoded data by the optical head 6 on the basis of a signal from main control unit 3.

Data reproduction from the optical disk 2 is performed by detecting the pits formed on the optical disk 2 by the optical head 6 and determining lengths and arrangement of the pits in the main control unit 3 on the basis of the RF signals outputted from the signal processing unit 15 to read the encoded data.

Recording tracks are formed on the optical disk 2 concentrically or convolutedly with a predetermined pitch. Each recording track is further divided radially into equal sectors as minimum recording units. In each sector, an address value for identifying each sector is previously written by the pits. Through the above-mentioned operations, the optical head 6 and the main control unit 3 constitute a data writing means and a data reading means.

In the writing/reading operation of encoded data, the main control unit 3 drives the optical head 6 to radiate light beam on the optical disk 2 and to receive the reflected light as well as drives the spindle motor 11 to rotate the optical disk 2. Furthermore, the main control unit 3 detects the address value of each sector to identify the sector and performs writing or reading the encoded data in units of sectors based on the pits detected by the optical head 6 or the RF signals outputted from the signal processing unit 15.

FIGS. 2A to 2C each shows a data structure of a DVD+RW in VR (Video Recording) mode in which data is written by the optical disk recorder 1 configured as above. These figures show changes in the data structure before and after saving of file management data and data structure after return of the saved data. The DVD+RW is an optical disk in which data can be rewritten any number up to a predetermined number of times. With using an optical disk formatted in the DVD+RW form, the user can make a DVD video which can be reproduced by a DVD video player and make an optical disk used in a DVD-ROM drive in a personal computer. The DVD+RW can be used in a DVD+RW-enabled video recorder. With the DVD+RW (DVD+VR) in which data is written in the VR mode, editing of animated data and addition of video data can be carried out and the user need not make finalization. Finalization refers to processing for prohibiting writing of additional data. Finalization also refers to processing for making media recognizable in general DVD players and DVD-ROM drives.

The optical disk 2 has a user data area "B" for storing user data therein and a file management data area "A" for storing file management data to control the user data. The file management data area "A" extends from logical sector number LSN 0×0000h to 0×3999h (hexadecimal number). That is, the size of the file management data area "A" is 0×4000h. The user data area "B" starts from LSN 0×4000h and stores the user data such as video data.

FIG. 2A shows the data structure after the user writes, for example, two titles of video data. When the user operates the optical disk recorder 1 to record one title of video data, the optical head 6 writes VTS (Video Title Set) on the optical disk 2 corresponding to a signal from the main control unit 3. In addition, FIG. 2A shows the data structure when the user data and so on are written on the optical disk 2 in which the user data and the file management data are erased by formatting or erasing all data.

The VTS is a block of program information comprised of VTSI (Video Title Set Information), VTSM_VOBS (Video Objects for Video Title Set Menu), VTSTT_VOBS (Video Objects for Titles in a Video Title Set) and VTSI (BUP). The VTSI is control information of VTS, which is formed of one file named as VTS_##_0.IFO. The VTSM_VOBS is material information of a menu picture unique to the program, which is formed of one file named as VTS_##_0.VOB. The material of the menu picture includes still pictures or moving pictures. The menu picture unique to the program enables menu selection unique to the program. The VTSTT_VOBS is video information, which is formed of a plurality of files named as VTS_##_@.VOB. The VTSI (BUP) is a backup which is formed of one file named as VTS_##_0.BUP. Although the VTSM_VOBS is not necessarily required, the VTSI, the VTSTT_VOBS and the VTSI (BUP) are necessary for reproducing the video data. An integer of 01 to 99 fits in ## and an integer of 1 to 9 fits in @. The VTSI constitutes file management data and is written into the file management data area "A". The VTSM_VOBS (not shown), the VTSTT_VOBS and the VTSI (BUP) constitute user data and are written into the user data area "B". In FIGS. 2A to 2C, numerals added to the VTSI, the VTSTT_VOBS and the VTSI (BUP) designates numbers of titles written on the optical disk 2.

When second video data are additionally written, new VTSI#2 is written into the file management data area "A" and new VTSTT_VOBS#2 and VTSI (BUP)#2 are written into the user data area "B". The new VTSI#2 is written subsequent to the VTSI#1 which was written in the first writing. The new VTSTT_VOBS#2 is written subsequent to the VTSTT_VOBS#1 written in the first writing and the new VTSI (BUP)#2 is written subsequent to the written VTSI (BUP)#1. When there is no space in the user data area "B" and/or the file management data area "A" for newly writing data into the optical disk, or when the user instructs erasure of the written user data, the new user data and/or file management data may be overwritten over the written user data and/or file management data.

The file management data is further comprised of, for example, file system information such as UDF (Universal Disk Format) and VMG (Video Manager) and is stored into the file management data area "A". Based on a signal from the main control unit 3, the optical head 6 writes the VMG from a particular address and the file system information is written between a head of the file management data area "A" and the area in which the VMG is stored.

The VMG is formed of VMGI (Video Manager Information), VMGM_VOBS (Video Objects for Video Manager Menu) and VMGI (BUP). The VMGI is control information of the whole video area, which is formed of one file named as VIDEO_TS.IFO. The VMGM_VOBS is formed of one file named as VIDEO_TS.VOB and contains material information of the menu picture displayed on the monitor display apparatus first when DVD is reproduced. The materials of the menu picture contain still pictures or moving pictures. The menu picture enables menu selection by the user. The VMGI (BUP) is a backup of the VMGI, which is formed of one file named as VIDEO_TS.BUP. Although the VMGM_VOBS is not necessarily required, the VMGI and the VMGI (BUP) are necessary for reproducing the video.

FIG. 2B shows the data structure in the DVD+RW in the VR mode after the file management data is saved. When the user presses the data erasure key 41 or the data erasure button 51, the main control unit 3 recognizes the data erasure instruction. Alternatively, when the user selects the data erasure item in the menu picture displayed on the screen of the monitor display apparatus 7, the main control unit 3 recognizes the data erasure instruction. When recognizing the data erasure instruction, the main control unit 3 reads all data in the file management data area "A" with using the optical head 6 before the data is erased according to the above-mentioned instruction.

A program for selecting available file management data is incorporated into the ROM 25 which stores the operation program of the main control unit 3. The available file management data is selected among the read data by the main control unit 3 serving as an information selection means. The available file management data includes the VTSI, VMG and file system information which manage available user data. Data not selected includes information relating to the user data which becomes unavailable due to overwriting or erasure, file management data which becomes unavailable due to overwriting or erasure and information in a space area. Through such operations, a size of data to be saved can be reduced, so that it is possible to reduce the size of the area for storing the file management data to be saved therein.

Divided file management data which manages the same user data among the selected file management data is optimized by the main control unit 3. The main control unit 3 writes the header and the optimized file management data in the RAM 9 through the connection unit 8 so as to save the file management data as backup data. In addition, a backup of the header may be written. Since the RAM 9 is formed of a semiconductor device, data writing speed is fast and thus, data writing time can be shortened. Following to saving of the file management data, the main control unit 3 writes data for erasing file management data in the file management data area "A" with using the optical head 6. For example, the optical head 6 overwrites the existing data by writing a value 0 or a value 1 in the file management data area "A", entirely or randomly. Thus, the file management data which manages the user data is erased and the user cannot access to the user data. With such configuration, when a person other than the user instructs erasure of the data to the optical disk recorder 1 and the file management data is erased, it is possible to access to the user data again by using the saved file management data.

FIG. 2C shows the data structure in the DVD+RW in the VR mode after the file management data is returned. When the user presses the data erasure cancel key 42 or the data erasure cancel button 52, the main control unit 3 recognizes the data erasure instruction. Alternatively, when the user selects the item for canceling the data erasure instruction on the menu picture displayed on the screen of the monitor display apparatus 7, the main control unit 3 recognizes the instruction to cancel the data erasure instruction. When recognizing the instruction to cancel the data erasure instruction, based on the instruction, the main control unit 3 reads out the saved file management data from the RAM 9 through the connection unit 8. Since the RAM 9 is formed of the semiconductor device and access speed is fast, data reading time can be shortened.

The header information written in the RAM 9 includes an address in the file management data area "A". Based on the header information, the optical head 6 writes the read file management data to the file management data area "A" of the optical disc 2 and thereby the file management data is returned. The optical head 6 writes the file management data, for example, from the leading position of the file management data area "A". In the case where the backup of the header is written in the RAM 9, when the user cannot access to the header or read the header information, the main control unit 3 accesses the backup of the header. Through the above-mentioned procedure, the saved file management data can be returned to the file management data area "A", after erasure of the data. Based on the returned file management data, the user can access to the user data and reuse the data prior to erasure.

Figure 3:
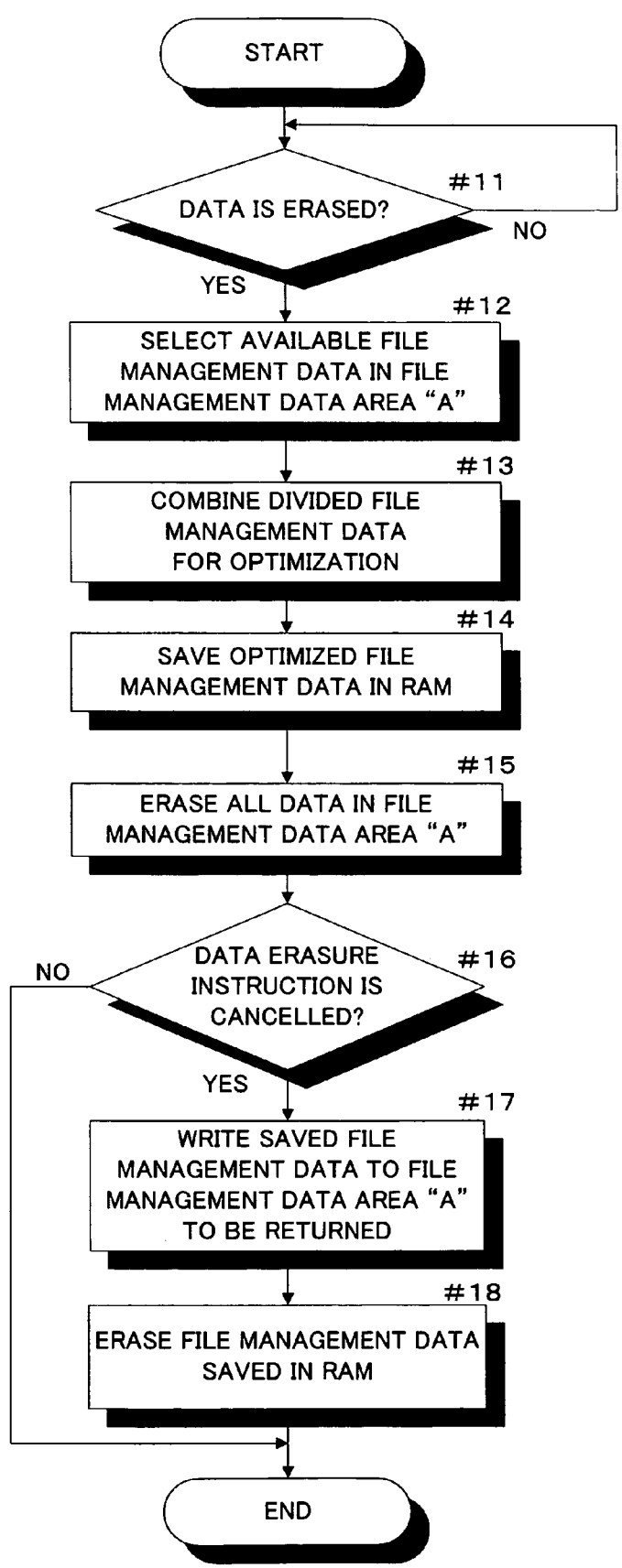
FIG. 3 is a flowchart showing an operation of the above optical disk recorder in the first embodiment when data written in the optical disk is erased.

FIG. 3 shows the operation when the optical disk recorder 1 erases data written on the optical disk. When the power of the optical disk recorder 1 is turned on and the user inserts the optical disk 2 into the optical disk recorder 1, the optical disk recorder 1 is put into a standby mode. When the user presses the data erasure button 51 provided in the operation unit 5 or the data erasure key 41 provided in the remote controller 4, or when the item for erasure of the data is selected on the menu picture displayed on the screen of the monitor display apparatus 7 (Yes in step #11), the main control unit 3 reads data from the file management data area "A" with using the optical head 6 and selects the available file management data from the read data (#12). Thus, only necessary file management data can be selected, thereby reducing the size of the data to be saved. When the user does not instruct erasure of the data to the main control unit 3 and to perform the other operation (No in step #11), the optical disk recorder 1 is in a standby mode.

The main control unit 3 optimizes the selected file management data (#13). A program for optimizing data is incorporated into the ROM 25 which stores the operation program of the main control unit 3 therein. Since the DVD+RW is a rewritable optical disk, data can be rewritten up to a certain number of times. In the rewriting, new file management data may be written over the written file management data. When sizes of both data are different from each other and the size of the new file management data is larger than that of the previous file management data, different data may be written at another location. The same applies also when the new file management data is written in a space area. In such a case, the file management data concerning the same user data is divided and stored in the file management data area "A". The main control unit 3 serving as a data optimization means combines the divided file management data which manages the same user data among the read file management data and optimizes the combined data. Thus, after erasure of the data and return of the file management data, access time to the file management data can be shortened. Furthermore, it is not necessary to access the file management data which is divided and stored in noncontiguous areas.

The main control unit 3 writes the optimized file management data together with the header into the RAM 9 through the connection unit 8 so as to save them (#14). Following to saving of the file management data, all data in the file management data area "A" is erased (#15). Thus, even after the data in the file management data area "A" is erased, the file management data which had been stored in the area can be used again.

When the user does not cancel the data erasure instruction after erasure of the data (No in step #16), a series of operations is completed. When the user presses the data erasure cancel button 52 or the data erasure cancel key 42, or when the user selects the item for canceling the data erasure instruction in the menu picture on the screen of the monitor display apparatus 7 (Yes in step #16), the main control unit 3 reads out the saved file management data from the RAM 9 through the connection unit 8 and drives the optical head 6 to write the file management data the into the file management data area "A" to be returned thereto (#17). Following to return of the file management data, the file management data in the RAM 9 is erased by the main control unit 3 so as not to bring about obstacles to operations other than data saving to the RAM 9 (#18). Following to return of the file management data, for example, when the file management data is added or updated by writing new user data on the optical disk 2, the file management data saved in the RAM 9 is erased. Furthermore, when the optical disk 2 is detached from the optical disk recorder 1 and inserted into the optical disk recorder 1 again, the main control unit 3 erases the file management data saved in the RAM 9. When power supply to the RAM 9 is blocked, since the RAM 9 is a volatile memory, the saved file management data disappears. After that, a series of operations is completed. Through the above-mentioned procedure, the user can use the file management data before erasure of the data and use the user data managed by the file management data again.

Second Embodiment

Subsequently, an optical disk recorder in accordance with a second embodiment will be described with reference to FIG. 4 to FIG. 6. The second embodiment is different from the first embodiment in that the storage device which saves the file management data therein is a hard disk drive (HDD) apparatus. The hard disc drive apparatus constitutes an external storage device.

Figure 4:
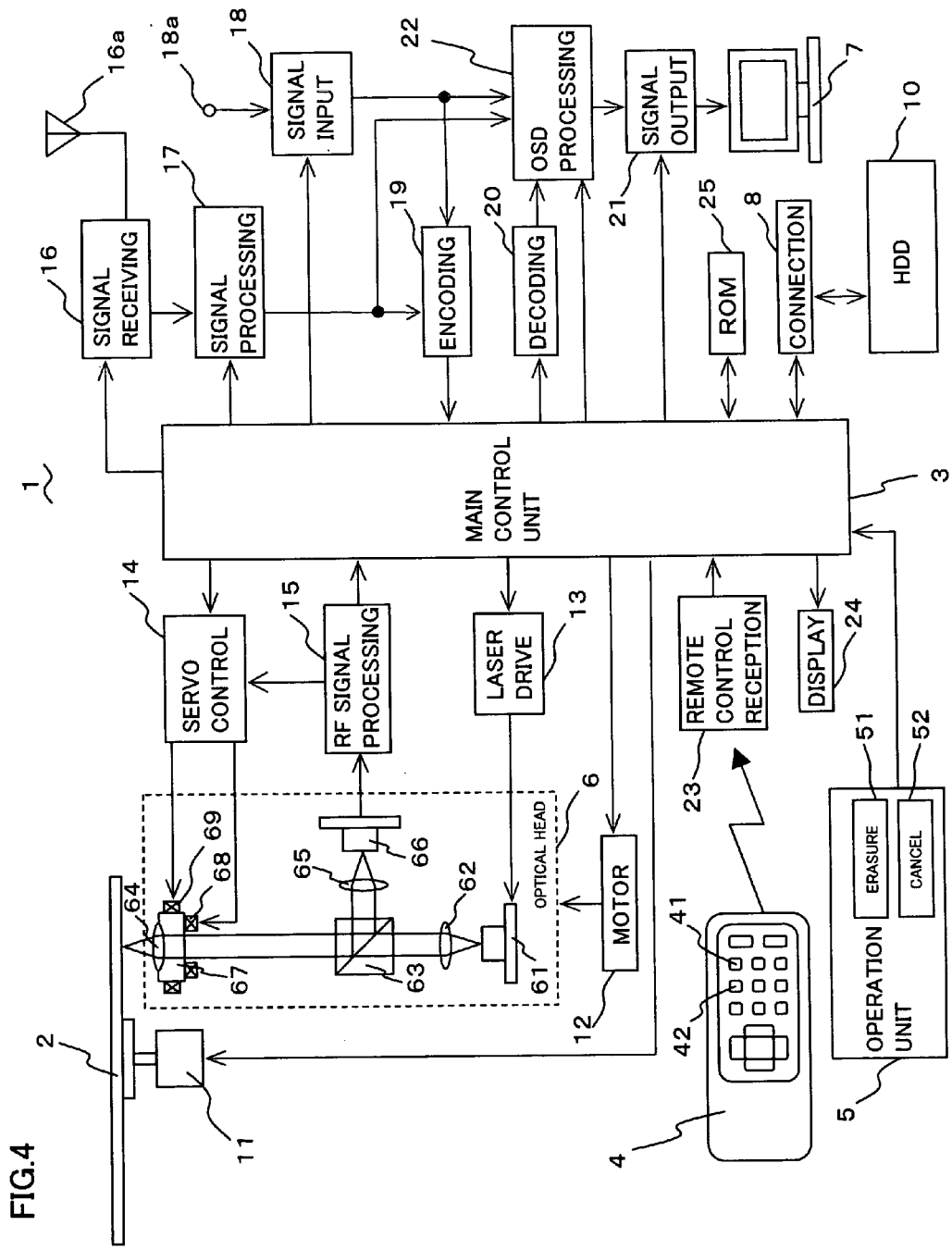
FIG. 4 is a block diagram showing a configuration of an optical disk recorder in accordance with a second embodiment of the present invention.

FIG. 4 is a block diagram showing a constitution of the optical disk recorder in the second embodiment. FIG. 4 is different from FIG. 1 in that the storage device connected to the optical disk recorder 1 through the connection unit 8 is a hard disk drive apparatus 10, not the RAM 9. In the hard disk drive apparatus 10, a plurality of magnetic disks stacked in the rotational axis direction are rotated by a motor at high speed and data is written/read to/from the magnetic disks using a magnetic head. In comparison with the RAM, the hard disk drive apparatus is less expensive and has a larger storage capacity. The hard disk drive apparatus 10 may be mounted in a housing of the optical disk recorder 1 or may be connected to the optical disk recorder 1 from the outside. The connection unit 8 is a connector for electrically connecting the main control unit 3 to the hard disk drive apparatus 10. The connection unit 8 may be a connector which meets any of IDE (Integrated Drive Electronics), EIDE (Enhanced Integrated Drive Electronics), ATA (AT Attachment) or standards subsequent to ATA, Ultra ATA (Ultra AT Attachment), SCSI (Small Computer System Interface) or standards subsequent to SCSI.

FIG. 5A shows a data structure in the DVD+RW in the VR mode after the user writes, for example, two titles of video information. The file management data is formed of UDF as file system information, VMG as control information of the whole optical disk and VTSI#1, #2 as control information of each title of video data, and is stored into the file management data area "A". The user data formed of VTSTT_VOBS#1, #2 as video information and VTSI (BUP)#1, #2 as backups of the VTSI#1, #2 is written into the user data area "B".

FIG. 5B shows a data structure in the optical disk 2 after the file management data is saved. When the main control unit 3 receives the data erasure instruction from the user, the data is read from the file management data area "A" prior to erasure of the data. Available file management data is selected from the read data by the main control unit 3. Through these operations, size of the data to be saved in the hard disk drive apparatus 10 can be reduced and size of the area occupied by the saved file management data in the hard disk of the hard disk drive apparatus 10 can be made smaller.

Among the selected file management data, the divided file management data which manages the same user data is optimized by the main control unit 3. The main control unit 3 writes the header and the optimized file management data in the hard disk of the hard disk drive apparatus 10 so as to save the file management data as backup data. In addition, when the user cannot access the header, a backup of the header may be written to access the saved file management data. Following to saving of the file management data, the main control unit 3 drives the optical head 6 to write erasing data for erasing the file management data in the file management data area "A" and then to erase all data in the file management data area "A". With such a configuration, even when a person other than the user instructs erasure of the data to the optical disk recorder 1 and the data in the file management data area "A" is erased, since the file management data is saved, the data can be used again.

FIG. 5C shows a data structure in the DVD+RW in the VR mode after the file management data is returned. Header information written in the hard disk of the hard disk drive apparatus 10 includes an address in the file management data area "A". The main control unit 3 reads out the saved file management data from the hard disk of the hard disk drive apparatus 10 and based on the header information, the read file management data is written into the file management data area and returned thereto. The main control unit 3 drives the optical head 6 to write the file management data, for example, from a leading position of the file management data area "A". Thus, even after erasure of the data, on the basis of the returned file management data, the user data before erasure can be used again.

Figure 6:
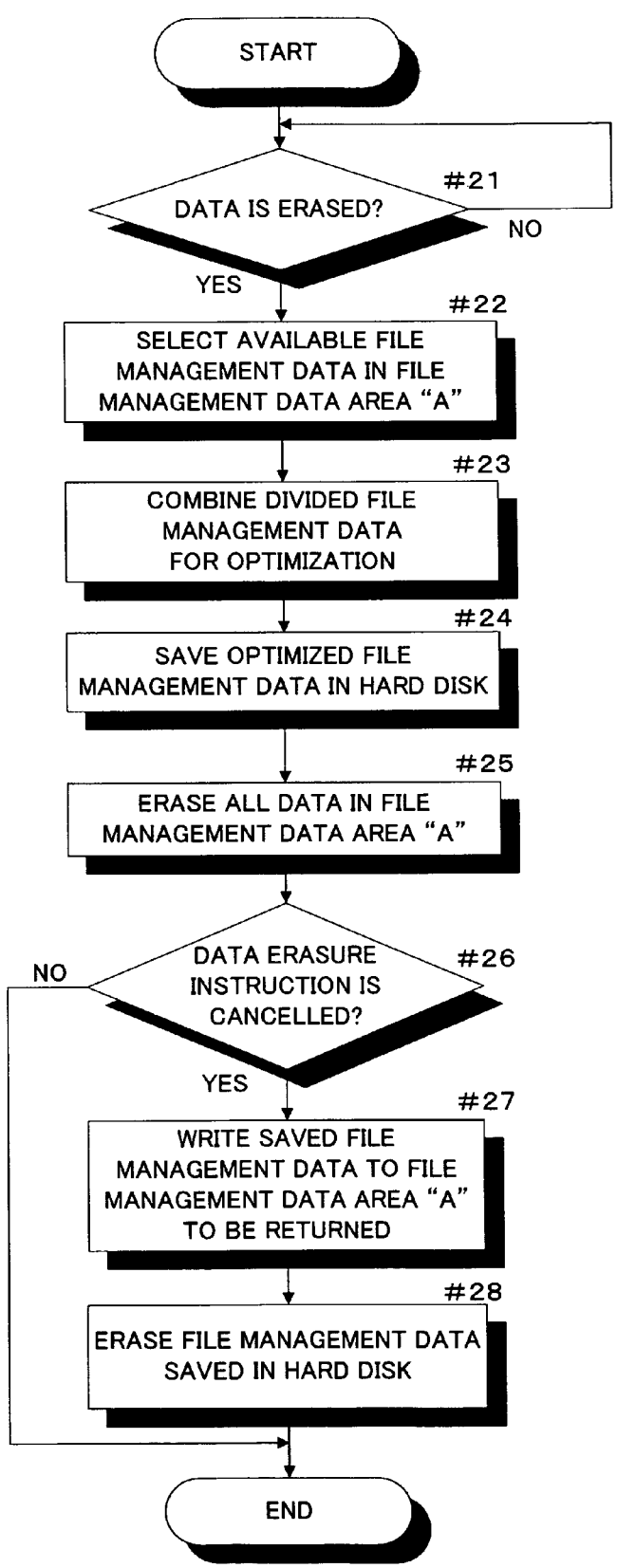
FIG. 6 is a flowchart showing an operation of the optical disk recorder in the second embodiment when data written in the optical disk is erased.

FIG. 6 shows an operation of the optical disk recorder 1 when the data written in the optical disk is erased. When power of the optical disk recorder 1 is turned on and the user inserts the optical disk 2 into the optical disk recorder 1, the optical disk recorder 1 is put into a standby mode. When the user issues the data erasure instruction to the main control unit 3 (Yes in step #21), the main control unit 3 reads out data from the file management data area "A" with using the optical head 6 and selects available file management data from the read data (#22). Thus, only necessary data can be picked out and saved without saving unnecessary data, thereby reducing size of the data to be saved. When the user does not instruct data erasure to the main control unit 3 and perform other operations (No in step #21), the optical disk recorder 1 is in the standby mode.

The main control unit 3 optimizes the selected file management data (#23). According to this operation, the file management data managing the same user data, which is divided and stored in a plurality of areas, is combined. Thus, following to the return of the file management data, the user can access to the combined file management data, thereby shortening access time.

The main control unit 3 writes the optimized file management data together with the header in the hard disk of the hard disk drive apparatus 10 through the connection unit 8 (#24). After saving of the file management data, all the data in the file management data area "A" are erased (#25). Through such procedure, after the processing of erasing the data, the file management data stored in the area can be used again.

When the user does not cancel the data erasure instruction after erasure of the file management data (No in step #26), a series of operations is completed. When the user instructs cancellation of the data erasure instruction to the main control unit 3 (Yes in step #26), the main control unit 3 reads the saved file management data from the hard disk of the hard disk drive apparatus 10 through the connection unit 8. Based on a signal from the main control unit 3, the optical head 6 writes the file management data into the file management data area "A" to be returned thereto (#27). Following return of the file management data, the hard disk drive apparatus 10 erases the file management data in the hard disk according to a signal from the main control unit 3 (#28). Following to the return of the file management data, for example, when the file management data is added or updated by writing new user data in the optical disk 2, the file management data saved in the hard disk is erased by the hard disk drive apparatus 10. Furthermore, when the optical disk 2 is detached from the optical disk recorder 1 and then inserted into the optical disk recorder 1 again, the hard disk drive apparatus 10 erases the file management data in the hard disk. After that, a series of operations is completed. Through such procedure, the user can use the file management data again before erasure of the data and access to the user data managed by the file management data.

The present invention is not limited to the configuration of the above-mentioned embodiments and can be variously modified so as not to deviate from the scope of the invention. For example, the optical disk 2 is not limited to the DVD+RW and may be a CD-RW, a DVD-RAM or a DVD-RW. The optical disk recorder 1 is not limited to the DVD recorder and may be a DVD+RW drive, a DVD-RW drive, a DVD-RAM drive or a CD-RW drive, which are mounted in electronic equipment such as optical personal computers. The user data written into the optical disk 2 is not limited to video information and may be data such as music, sound or documents. When the user operates the optical disk recorder 1 to take out the optical disk 2 after saving of the file management data and before return the file management data saved in the hard disk or the RAM, the main control unit 3 writes information in the optical disk 2 and following reinsertion of the optical disk 2, based on the information, the main control unit 3 may read the file management data from the hard disk or the RAM and allow the read file management data to return to the optical disc 2.

This application is based on Japanese patent application 2005-265338 filed Sep. 13, 2005 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical disk recorder comprising:
a data writing means for writing data into an optical disk;
a data reading means for reading data from an optical disk;

a data erasure instruction means, which is operated by a user, to instruct to perform erasure of data of an optical disc to the data writing means;

a data erasure instruction cancel means, which is operated by the user, to instruct to cancel the data erasure instruction to the data writing means;

a main control means for controlling entire of the optical disc recorder;

a connection means for connecting the main control means with an external storage device and/or a RAM (Random Access Memory);

a data selection means for selecting file management data among data read from the file management data area; and a data optimization means which combines divided file management data which manages a same user data among the file management data and optimizes the combined data, wherein when the data erasure instruction means instructs to perform erasure of data of an optical disc, the data reading means reads out all data from the file management data area of the optical disc before erasing of the file management data, the data selection means selects available file management data among the data read from the file management data area, the data optimization means optimizes the selected available file management data, the data writing means writes the optimized available file management data with a header having location information of the file management data area into the external storage device and/or the RAM so as to save the file management data, and subsequently the data writing means write predetermined data for erasing the file management data originally written in the file management data area; and when the data erasure instruction cancel means instructs to cancel the erasure of the data, the main control means reads out the file management data and the header saved in the external storage device and/or the RAM through the connection means, and the data writing means writes the file management data read out from the external storage device and/or the RAM into the file management data area where the file management data were originally written based on the information of the header.

\* \* \* \* \*